United States Patent [19]

Reiter et al.

[11] Patent Number: 4,751,107

[45] Date of Patent: Jun. 14, 1988

[54] HEAT-CURABLE HOT-MELT ENAMEL AND ITS PREPARATION

[75] Inventors: Udo Reiter, Teltge; Hans-Josef Oslowski, Ludwigshafen; Horst Reimann, Worms; Helmut Lehmann, Reinbek, all of Fed. Rep. of Germany

[73] Assignee: BASF Aktiengesellschaft, Ludwigshafen, Fed. Rep. of Germany

[21] Appl. No.: 859,904

[22] Filed: May 5, 1986

[30] Foreign Application Priority Data

May 17, 1985 [DE] Fed. Rep. of Germany ....... 3517753

[51] Int. Cl.$^4$ .................. B05D 5/12; C08F 283/04
[52] U.S. Cl. .................... 427/116; 427/178; 427/388.1; 525/424; 525/425; 525/432
[58] Field of Search ............. 427/116, 178, 388.1, 427/388.2; 525/424, 425, 432

[56] References Cited

U.S. PATENT DOCUMENTS

| | | | |
|---|---|---|---|
| 2,936,296 | 5/1960 | Precopio et al. | 524/352 |
| 2,995,531 | 8/1961 | Hudson | 524/300 |
| 3,260,691 | 7/1966 | Lavin et al. | 524/104 |
| 3,313,781 | 4/1967 | Beck et al. | 428/379 |
| 3,397,253 | 8/1968 | Merten et al. | 427/388.1 |
| 3,426,098 | 2/1969 | Meyer et al. | 428/379 |
| 3,657,177 | 4/1972 | Adesko et al. | 524/541 |
| 3,953,649 | 4/1976 | Suzuki et al. | 428/383 |
| 3,975,571 | 8/1976 | Kawaguchi et al. | 427/116 |
| 4,031,287 | 6/1977 | Suzuki et al. | 428/379 |
| 4,319,006 | 3/1982 | Yamada et al. | 525/424 |
| 4,404,331 | 9/1983 | Pauze | 525/424 |

FOREIGN PATENT DOCUMENTS

| | | |
|---|---|---|
| 1644813 | 1/1971 | Fed. Rep. of Germany . |
| 973377 | 10/1964 | United Kingdom . |
| 996649 | 6/1965 | United Kingdom . |
| 1339810 | 5/1973 | United Kingdom . |
| 1424743 | 11/1976 | United Kingdom . |
| 2037788 | 7/1980 | United Kingdom . |

OTHER PUBLICATIONS

Chemical Abstracts, vol. 96, 201,381f (1982).

*Primary Examiner*—Thurman K. Page
*Attorney, Agent, or Firm*—Keil & Weinkauf

[57] ABSTRACT

Heat-curable hot-melt enamels, a process for their preparation, and the production of highly heat-resistant wire windings. These heat-curable hot-melt enamels are solutions of a nylon in organic solvents, which contain, as the nylon, a nylon possessing functional amino groups and additionally contain a blocked di- or polyisocyanate. They are useful for the production of highly heat-resistant wire windings.

12 Claims, No Drawings

HEAT-CURABLE HOT-MELT ENAMEL AND ITS PREPARATION

The present invention relates to heat-curable hot-melt enamels (bonding enamels), their preparation and the production of highly heat-resistant wire windings, in particular the production of coils which can be exposed to heat and subjected to mechanical loads and consist of enameled wires, whose turns are bonded to one another by melting and subsequent solidification of such a bonding enamel layer by means of an internal (Joule heat) or external heat supply.

The novel hot-melt enamel is based on solutions of nylons to which alternatively polyhydantoin resins, polyamidoimides, polyesterimides and/or polyesters may be added.

It has long been known that two different types of materials can be used as bonding enamels: thermoplastic and duromeric systems.

The use of thermoplastic polymers is described in, for example, German Laid-Open Applications DOS No. 2,318,664 and DOS No. 2,341,191. In the conventional and commercially available systems, the advantage of excellent coil stability is essentially offset by the disadvantages of low resoftening temperatures, low and hence uneconomical solids contents and great sensitivity to solvents. These disadvantages are particularly serious in the construction of motors and transformers.

Duromer systems which undergo a transformation from a plastic B state to the cured C state as a result of chemical crosslinking during bonding form the subject of, for example, British Pat. No. 1,424,743 and U.S. Pat. No. 3,657,177.

However, the conventional and commercially available combinations of components and crosslinking principles result in bonding enamels having a low mechanical strength or in resoftening temperatures which in no way meet the requirements of the market. The high bonding temperatures used to date further restrict the use, owing to the thermosensitivity of the slot insulation materials.

It is an object of the present invention to provide novel hot-melt enamels which do not have these disadvantages.

We have found that this object is achieved and that, surprisingly, a combination of a nylon, which is thermoplastic but, in contrast to the conventional industrial nylon plastics, is provided with functional amino groups by means of excess amine, with small amounts of an isocyanate crosslinking agent, with or without the addition of a polyhydantoin, polyamidoimide, polyester and/or polyesterimide, possesses both excellent mechanical properties prior to bonding and, compared with the industrial standard, substantially higher resoftening temperatures and bonding strengths after bonding.

The present invention relates to a heat-curable hot-melt enamel based on a solution of a nylon in an organic solvent which may or may not additionally contain a polyhydantoin, polyamidoimide, polyester and/or polyesterimide, wherein the hot-melt enamel contains, as the nylon, a nylon possessing functional amino groups, and additionally contains a blocked di- or polyisocyanate.

Polyamides which possess functional amino groups and contain from 50 to 1000 meq/kg of amino groups in the form of primary and/or secondary amino groups and have means molecular weights $M_n$ of from 4000 to 25,000, and di- and/or polyisocyanates, which are blocked with compounds possessing active hydrogen, e.g. phenol, are preferred.

The present invention furthermore relates to a process for the preparation of heat-curable hot-melt enamels based on a solution of a nylon in an organic solvent, which, if required, additionally contain a polyhydantoin, polyamidoimide, polyester or polyesterimide, wherein a nylon which possesses functional amino groups, contains from 50 to 1000 meq/kg of amino groups and has a means molecular weight $\overline{M}_n$ of from 4000 to 25,000 is prepared from starting materials conventionally used for the preparation of nylons having reduced crystallinity, and a blocked di- or polyisocyanate and, if required, a polyhydantoin, polyamidoimide, polyester and/or polyesterimide are added to the said nylon possessing functional amino groups.

The mixture preferably prepared is one which essentially consists of
(a) from 40 to 98% by weight of a nylon possessing functional amino groups,
(b) from 2 to 20% by weight of one or more blocked di- or polyisocyanates and
(c) from 0 to 60% by weight of a polyhydantoin, with the proviso that the sum of the percentages stated under (a) to (c) is 100, and this mixture of (a) to (c) is dissolved in one or more organic solvents.

The present invention furthermore relates to a process for the production of highly heat-resistant wire windings, wherein a wire coated with a heat-resistant enamel is coated with a hot-melt enamel, the coating is dried, the winding is then produced, and the coating is melted and cured by supplying heat, with the result that the individual wires of the winding are firmly bonded to one another.

The novel hot-melt enamels (bonding enamels) can be applied on conventional enameling units and with the usual application systems.

The novel bonding enamels are advantageously prepared by dissolving (a) a nylon possessing functional amino groups, if appropriate with the additional of (c) a polyhydantoin, polyamidoimide, polyester and/or polyesterimide resin, and (b) a blocked di- or polyisocyanate in an organic solvent or solvent mixture.

The solids content of this solution may be from 10 to 30, preferably from 13 to 20, % by weight, based on the total amount of the components (a) to (c).

The components (a) to (c) are present in general in the following amounts, based on the solids content of the resin:

from 40 to 98, preferably from 40 to 90, % by weight of a nylon (a) possessing functional amino groups, from 2 to 20, preferably from 3 to 10, % by weight of a blocked di- or polyisocyanate (b) and from 0 to 60, preferably from 20 to 50, % by weight of a thermally stable resin, preferably a polyhydantoin, and the sum of the percentages of components (a) to (c) is 100.

Regarding the components of the novel hot-melt enamels, the following may be stated specifically:

(a) For the purposes of the present ivnention, nylons possessing functional amino groups are those which carry free primary and/or secondary amino groups. For this purpose, it is possible to use conventional aliphatic and cycloaliphatic nylons which possess reduced crystallinity and are therefore soluble in the solvents used for this purpose. It is known that the crystallinity can be reduced by cocondensation of various lactams, such as caprolactam or laurolactam, amino acids, e.g. ω-aminoundecanoic acid and ω-aminocaproic acid, and/or diamines, such as those of 6 to 10 carbon atoms, e.g. hexamethylenediamine, or dicarboxylic acids of 6 to 10 carbon atoms, e.g. adipic acid or sebacic acid, and by incorporating bulky monomers, such as 2,2,4-trimethylhexamethylene-1,6-diamine, isophoronediamine, 4,4'-diaminodicyclohexylmethane, 3,3'-dimethyl-4,4'-diaminodicyclohexylmethane and the like.

In the determination of the terminal amino groups of the nylons by titration, a value of from 50 to 1000, preferably from 80 to 500, meq/kg of amino groups should be reached.

This amino functionality can be established during condensation of the nylons by using an appropriate excess amount of mono- or polyfunctional amines, such as stearylamine or, preferably, hexamethylenediamine.

The nylons possessing functional amino groups and employed according to the invention are prepared by condensing the starting materials by a conventional method, for example precondensation of the melt in the presence of a little water in a closed system, followed by post-condensation in an open system with removal of the water. The desired molecular weights can be established via the stoichiometry and, if necessary, by the presence of monofunctional compounds.

An example of a suitable nylon is one which consists of 60 parts by weight of AH salt and 40 parts by weight of caprolactam. By means of excess hexamethylenediamine, a concentration of terminal amino groups of, for example, 192 meq/kg can then be established. The relative viscosity in this case was 1.9, measured in a capillary viscometer on a 1% strength solution in concentrated sulfuric acid.

(b) Suitable blocked di- and/or polyisocyanates are those whose isocyanate groups are blocked with a H-active compound, e.g. a CH-acidic, OH-acidic or NH-acidic compound, such as methyl ethyl ketoxime, caprolactam or phenol, examples of such blocked isocyanates being toluylene 2,4-and/or 2,6-diisocyanate, hexamethylene-1,6-diisocyanate, isophorone diisocyanate, reaction products of toluylene diisocyanate with a polyalcohol mixture (e.g. Desmodur ® AP from Bayer AG) or trimerized toluylene 2,4-diisocyanate, each of which is appropriately blocked. Preferred blocking agents are ε-caprolactam and phenol.

(c) Among the thermally stable resins (c), which may or may not be present, polyhydantoin resins are preferred. Suitable polyhydantoin resin components are described in, for example, German Pat. No. 1,570,552 and German Laid-Open Application DOS No. 2,054,602, an example being Resistherm ® PH 30. Suitable polyamidoimides are described in, for example, U.S. Pat. No. 3,260,691, suitable polyesters in, for example, German Pat. Nos. 1,033,291 and 1,199,909, and suitable polyesterimides in, for example, German Published Application DAS No. 1,445,263 and U.S. Pat. No. 3,426,098.

The solvents used may be those conventionally employed in the preparation of coatings, preferably phenolic solvents, such as cresols and xylenols, N-methylpyrrolidone or dimethylformamide, with or without the addition of aromatic hydrocarbons, such as xylene, or a mixture of these, such as Solvesso 100.

The novel bonding enamels are applied in general to wires which consist of copper, copper alloys or aluminum and are coated with an insulating layer of a highly heat-resistant resin usually used for electrical insulation, eg. a polyesterimide, a polyester or a two-coat combination of a polyester and a nylon. To dry the individual layers of bonding enamel, the insulated wires are coated at baking temperatures of about 300° C. and at a suitable coating speed. This gives self-bonding wires which produce firmly wound coils, have a long shelf life and, when wound into appropriate coils, are bonded in a short time at from 170° to 210° C., for example by hot air or by heating the coil by means of an electric current. In this way, dimensionally stable, heat-resistant coils which likewise possess substantially increased resoftening temperatures and bonding strengths are obtained under conditions which are milder than the prior art ones.

In the Examples, parts and percentages are by weight.

EXAMPLE 1

56.5 parts of xylenol 50 (industrial mixture of xylenol isomers) are initially taken, and 14 parts of a nylon which possesses functional amino groups and is prepared by a conventional condensation process from 34 parts of AH salt, 29 parts of caprolactam, 22 parts of 4,4'-diaminodicyclohexylmethane and 15 parts of adipic acid and has an $NH_2$ number of 192 meq/kg, and 4 parts of a polyhydantoin (e.g. Resistherm PH30) are added, and the mixture is heated to 100° C. and stirred at this temperature until all solid material has dissolved. 23.5 parts of Solvesso 100 are added, after which the mixture is cooled to 50° C., 2 parts of phenol-blocked polyisocyanate (e.g. Desmodur AP) are added and the mixture is filtered. A coating viscosity of 78 DIN sec (FORD cup 4) and a solids content of 14.5% are obtained by adding 2.4:1 xylenol/Solvesso mixture.

A 0.5 mm Cu wire coated with a commercial polyesterimide undercoat is coated with the coating prepared in this manner, on a conventional wire-enameling machine (oven length 2.50 m, oven temperature 320°/340° C.). A bonded coil has the following properties determined according to DIN 46,435:

Resoftening temperature:
after bonding for 30 minutes at 180° C.: 193° C.;
after bonding for 30 minutes at 200° C.: 207° C.

EXAMPLE 2

The procedure described in Example 1 is followed, except that 13% of the nylon possessing functional amino groups are combined with 4% of Resistherm PH30 and 3% of Desmodur AP.

The coil obtained as described in Example 1 has the following properties when tested according to DIN 46,435:

Resoftening temperature:
after bonding for 30 minutes at 180° C.: 193° C.;
after bonding for 30 minutes at 200° C.: 200° C.

COMPARATIVE EXAMPLE

For comparison, a commercial thermoplastic bonding enamel based on nylon is tested according to DIN 46,435:

Resoftening temperature:
after bonding for 30 minutes at 180° C.: 150° C.;
after bonding for 30 minutes at 200° C.: 157° C.

We claim:

1. A heat-curable hot-melt enamel based on a solution of a nylon in an organic solvent, wherein the hot-melt enamel contains, as the nylon, a nylon possessing functional amino groups, and additionally contains a blocked di- or polyisocyanate.

2. The hot-melt enamel of claim 1, wherein the nylon possessing functional amino groups contains from 50 to 1000 meq/kg of amino groups and has a mean molecular weight $\overline{M}_n$ of from 4000 to 25,000.

3. The hot-melt enamel of claim 1, which essentially consists of a mixture of
   (a) from 40 to 98% by weight of a nylon possessing functional amino groups,
   (b) from 2 to 20% by weight of one or more blocked di- or polyisocyanates and
   (c) from 0 to 60% by weight of a polyhydantoin, with the proviso that the sum of the percentages stated under (a) to (c) is 100, and this mixture of (a) to (c) is dissolved in one or more organic solvents.

4. The hot-melt enamel of claim 2, which essentially consists of a mixture of
   (a) from 40 to 98% by weight of a nylon possessing functional amino groups,
   (b) from 2 to 20% by weight of one or more blocked di- or polyisocyanates and
   (c) from 0 to 60% by weight of a polyhydantoin, with the proviso that the sum of the percentages stated under (a) to (c) is 100, and this mixture of (a) to (c) is dissolved in one or more organic solvents.

5. The self-bonding enamel of claim 1, wherein the blocked di- or polyisocyanate (b) is a di- or polyisocyanate blocked with a CH-acidic, OH-acidic or NH-acidic organic compound.

6. The hot-melt enamel of claim 2, wherein the blocked di- or polyisocyanate (b) is a di- or polyisocyanate blocked with a CH-acidic, OH-acidic or NH-acidic organic compound.

7. A process for the preparation of a heat-curable hot-melt enamel based on a solution of a nylon in an organic solvent, as defined in claim 1, wherein a nylon which possesses functional amino groups, contains from 50 to 1000 meq/kg of amino groups and has a mean molecular weight $\overline{M}_n$ of from 4000 to 25,000 is prepared from starting materials conventionally used for the preparation of nylons possessing reduced crystallinity, and a blocked di- or polyisocyanate.

8. The process of claim 7, wherein a mixture is prepared which essentially consists of
   (a) from 40 to 98% by weight of a nylon possessing functional amino groups,
   (b) from 2 to 20% by weight of one or more blocked di- or polyisocyanates and
   (c) from 0 to 60% by weight of a polyhydantoin, with the proviso that the sum of the percentages stated under (a) to (c) is 100, and this mixture of (a) to (c) is dissolved in one or more organic solvents.

9. The process of claim 7, wherein the blocked di- or polyisocyanate used in a di- or polyisocyanate blocked with a CH-acidic, OH-acidic or NH-acidic organic compound.

10. A process for the production of highly heat-resistant wire windings, wherein a wire coated with a heat-resistant enamel is coated with a hot-melt enamel as defined in claim 1, the coating is dried, a winding is produced, and the coating is melted and cured by supplying heat, with the result that the individual wires of the winding are firmly bonded to one another.

11. The heat-durable hot-melt enamel of claim 1, wherein the solution additionally contains a polyhydantoin, polyamindoimide, polyester and/or polyesterimide.

12. The process of claim 7, wherein the solution additionally contains a polyhydantoin, polyamindoimide, polyester and/or polyesterimide.

* * * * *